Leonard, Holcomb & Wright.
Hay Loader.
N° 95493.  Patented Oct. 5, 1869.

Witnesses:
O. Hinchman
Jacob V. Brooks

Inventors:
J. C. Leonard
S. B. Holcomb
W. B. Wright
per Munn & Co.

UNITED STATES PATENT OFFICE.

J. C. LEONARD, S. B. HOLCOMB, AND W. B. WRIGHT, OF CLINTON, MISSOURI.

IMPROVEMENT IN HAY RAKERS AND LOADERS.

Specification forming part of Letters Patent No. 95,493, dated October 5, 1869.

*To all whom it may concern:*

Be it known that we, J. C. LEONARD, S. B. HOLCOMB, and W. B. WRIGHT, of Clinton, in the county of Henry and State of Missouri, have invented a new and Improved Hay-Loader; and we do hereby declare that the following is a full, clear, and exact description thereof, which will enable others skilled in the art to make and use the same, reference being had to the accompanying drawings, forming part of this specification.

This invention relates to improvements in machinery for gathering hay or other like material and elevating it to the wagon as the two are moved along over the ground.

The invention consists in a rake and elevating apparatus mounted on two wheels to be attached to the rear end of the wagon, and arranged to gather the hay in front of the fixed curved teeth of the rake, from which it is taken by the elevator and delivered to the wagon in a peculiar manner, as hereinafter more fully specified.

Figure 2:
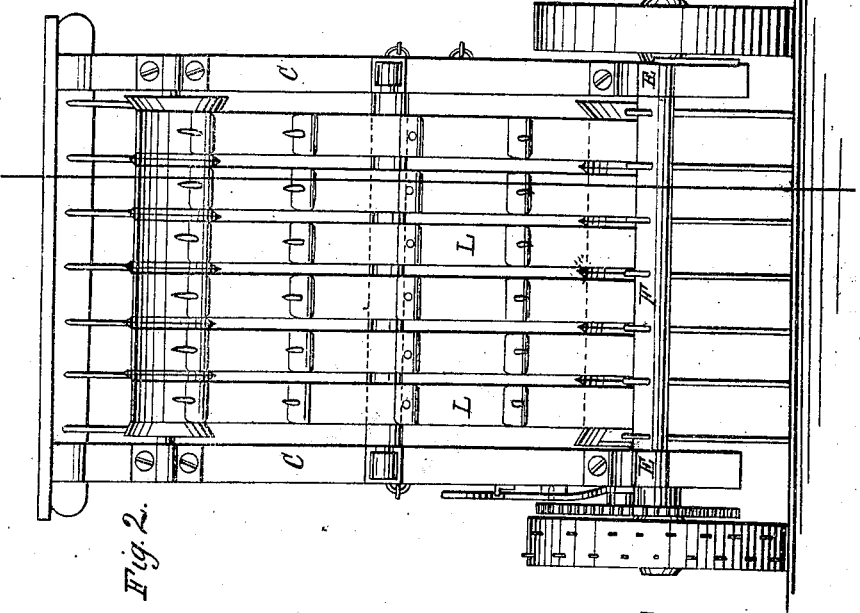
Figure 1:
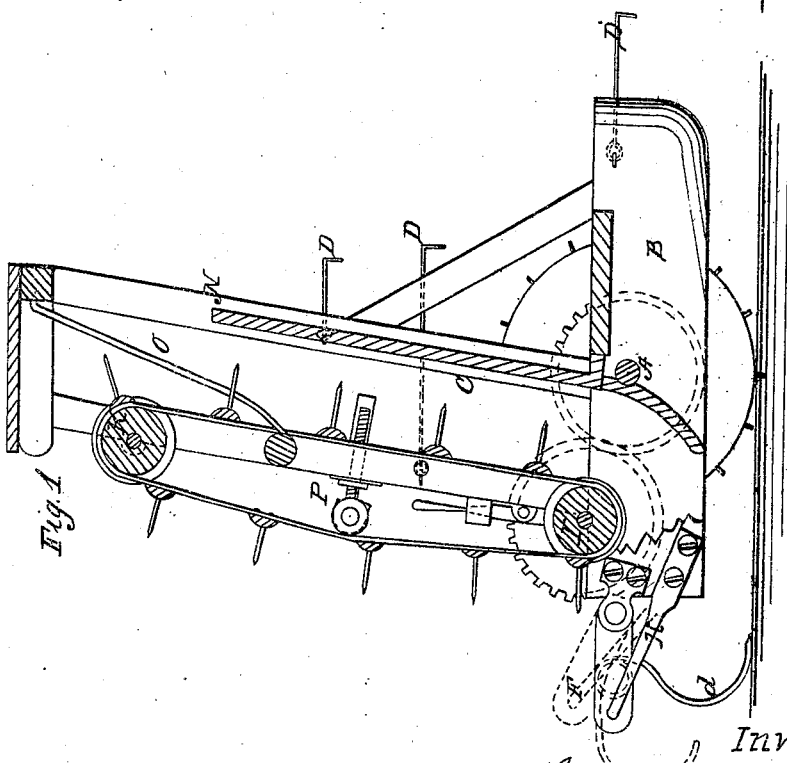

Figure 1 represents a longitudinal sectional elevation of our improved apparatus. Fig. 2 represents a rear elevation of the same.

Similar letters of reference indicate corresponding parts.

On the axle A of a two-wheeled truck we mount a frame, B, having a vertical extension, C. This frame is provided with hooks D or other devices for attachment to the rear end of a wagon for drawing it.

At the rear of the frame B, in hinged arms, we provide a rake-shaft, F, having curved teeth G for running along the ground to gather the hay.

H represents a spring-arm secured to the rear of the frame B below the axis of the arms E, having a bent outer end, which springs into a hole in the end of the arm E to hold the rake-teeth in the working position. It also holds the teeth above the working position when engaged with the top of the said arm.

On rollers I K, one at the top and the other at or near the bottom, we arrange an endless carrier, L, composed of belts of any preferred substance and teeth of metal projecting from the said belts perpendicularly, which carrier is set in motion by suitable gear-wheels connecting the lower roller with the axle of the truck.

In front of that part of the elevator which moves upward we arrange a broad chute or guide, M, which keeps the hay on the teeth of the elevator during the upward movement until a sufficient height has been attained for delivery to the wagon, and the apparatus is intended to be so adjusted relatively to the wagon that the top N of the said guide shall be near to the rear end thereof. Above the top N of the guide is an open space, through which the hay is delivered from the elevator to the wagon, and to facilitate this delivery spring-dischargers O project through the spaces between the belts and in an inclined upward direction in a manner to discharge the hay from the elevator and cause it to pass over the guide C to the wagon. The hay is gathered from the rake by the teeth of the elevator in their downward movement.

P represents an adjustable tension-roller for tightening the belts of the elevator.

Having thus described our invention, what we claim as new, and desire to secure by Letters Patent, is—

The combination of the hinged rake, elevator, spring-dischargers, and guide C, when arranged upon a truck, substantially as specified.

J. C. LEONARD.
S. B. HOLCOMB.
W. B. WRIGHT.

Witnesses:
P. P. LOBE,
J. S. LOBE.